United States Patent
Xu

(10) Patent No.: US 8,787,206 B2
(45) Date of Patent: Jul. 22, 2014

(54) MULTI-ADDRESS SPACE MOBILE NETWORK ARCHITECTURE, METHOD FOR REGISTERING HOST INFORMATION, AND METHOD FOR SENDING DATA

(75) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 536 days.

(21) Appl. No.: 12/425,672

(22) Filed: Apr. 17, 2009

(65) Prior Publication Data

US 2009/0201834 A1   Aug. 13, 2009

Related U.S. Application Data

(63) Continuation of application No. PCT/CN2008/070979, filed on May 16, 2008.

(30) Foreign Application Priority Data

Jul. 20, 2007   (CN) .......................... 2007 1 0129983

(51) Int. Cl.
*G06F 15/177* (2006.01)
*H04L 12/24* (2006.01)
*G06F 15/173* (2006.01)

(52) U.S. Cl.
CPC .......... *G06F 15/17331* (2013.01); *H04L 41/12* (2013.01)
USPC ............ 370/255; 709/242; 709/246; 709/252

(58) Field of Classification Search
CPC ... G06F 15/17331; H04L 45/02; H04L 41/12; H04L 43/12
USPC ...................... 370/254, 255, 395.5, 466, 474; 713/161, 170; 726/10
See application file for complete search history.

(56) References Cited

U.S. PATENT DOCUMENTS 7,103,625 B1   9/2006  Hipp et al.
7,418,454 B2 *  8/2008  Chen et al. ............. 707/999.101
(Continued)

FOREIGN PATENT DOCUMENTS

CN   1564543 A   1/2005
CN   1592260 A   3/2005
(Continued)

OTHER PUBLICATIONS

B. Ahlgren et al., "A Node Identity Internetworking Architecture", INFOCOM 2006, Apr. 23-29, 2006, 6 pages.*

(Continued)

*Primary Examiner* — Brian O'Connor
(74) *Attorney, Agent, or Firm* — Leydig, Voit & Mayer, Ltd.

(57) ABSTRACT

A multi-address space mobile network architecture is disclosed, in which edge networks (ENs) are connected to a core network (CN) through core edge routers (CERs). A distributed hash table (DHT) set in the CN is adapted to not only store or update a mapping relation between a CER ID and CER location information in the CN, but also receive registration information sent from a host through the CER, and store or update mapping relations between a host ID host identifier (HI) and the CER ID and between the HI and host location information. A method for registering host information includes the steps as follows. The host acquires routable host location information in an EN to which the host currently added and information of the CER in the EN. The host sends registration information to the CN through the CER in the EN. Further, a method for sending data is described. The network architecture and methods of the present invention may improve update and query efficiency of the registration information from the host.

21 Claims, 2 Drawing Sheets

(56) References Cited

U.S. PATENT DOCUMENTS

| | | | |
|---|---|---|---|
| 7,729,312 B2 * | 6/2010 | Suzuki et al. | 370/331 |
| 7,765,584 B2 * | 7/2010 | Roskind | 726/5 |
| 7,827,313 B2 * | 11/2010 | Salmela et al. | 709/246 |
| 7,849,195 B2 * | 12/2010 | Jokela et al. | 709/227 |
| 8,089,905 B2 * | 1/2012 | Umeshima | 370/256 |
| 8,233,489 B2 * | 7/2012 | Welin et al. | 370/395.32 |
| 2004/0240468 A1 | 12/2004 | Chin et al. | |
| 2006/0203739 A1 | 9/2006 | Padmanabhan et al. | |
| 2007/0115330 A1 | 5/2007 | Silverbrook | |
| 2007/0204150 A1 | 8/2007 | Jokela et al. | |
| 2007/0274312 A1 * | 11/2007 | Salmela et al. | 370/392 |
| 2007/0288613 A1 * | 12/2007 | Sudame et al. | 709/223 |
| 2008/0022354 A1 * | 1/2008 | Grewal et al. | 726/1 |
| 2008/0195865 A1 | 8/2008 | Nikander | |
| 2008/0271132 A1 | 10/2008 | Jokela et al. | |
| 2010/0208742 A1 * | 8/2010 | Kafle et al. | 370/401 |

FOREIGN PATENT DOCUMENTS

| | | |
|---|---|---|
| CN | 1697548 A | 11/2005 |
| CN | 1761233 A | 4/2006 |
| CN | 1801764 A | 7/2006 |
| CN | 1816217 A | 8/2006 |
| CN | 1939000 A | 3/2007 |
| CN | 1953419 A | 4/2007 |
| KR | 910000354 B1 | 1/1991 |
| KR | 20020058360 A | 7/2002 |
| KR | 20030011164 A | 2/2003 |
| WO | WO 2006/088403 A1 | 8/2006 |
| WO | WO 2006/133740 A1 | 12/2006 |

OTHER PUBLICATIONS

English Translation of the Written Opinion of the International Searching Authority for International Patent Application No. PCT/CN2008/070979.

Ahlgren et al., "A Node Identity Internetworking Architecture," *IEEE* (2006).

Ahlgren et al., "Node ID Internetworking Architecture," *9th IEEE Global Internet Symposium*, PowerPoint Presentation (Apr. 2006).

Xu et al., "Hierarchical Routing Architecture," *Next Generation Internet Networks*, 1-4 (May 2008).

* cited by examiner

MULTI-ADDRESS SPACE MOBILE NETWORK ARCHITECTURE, METHOD FOR REGISTERING HOST INFORMATION, AND METHOD FOR SENDING DATA

CROSS-REFERENCE TO RELATED APPLICATIONS

This application is a continuation of International Patent Application No. PCT/CN2008/070979, filed May 16, 2008, which claims priority to Chinese Patent Application No. 200710129983.9, filed Jul. 20, 2007, both of which are hereby incorporated by reference in their entirety.

FIELD OF THE INVENTION

The present invention relates to a mobile Internet protocol (IP) technique, and more particularly to a multi-address space mobile network architecture, a method for registering host information, and a method for sending data.

BACKGROUND

Node identifier (Node ID) network architecture is a network protocol system for the next generation network. In the network architecture, a locator domain (LD) is introduced, which is adapted to identify the network adopting an independent address space, such as Internet protocol version 4 (IPv4) network and Internet protocol version 6 (IPv6) network. The Node ID adopts a tree networking structure, one static core network (CN) and a plurality of movable edge networks (EN) exist in the Node ID network architecture. The ENs may be directly connected to the CN, and may be indirectly connected to the CN through other ENs. An edge router interconnected among different ENs is referred to as an edge router (ER) and the edge router interconnected between the CN and the ENs is referred to as a core edge router (CER). The CN and each EN in the network architecture adopt independent address spaces, and the networks adopting the independent address spaces are identified by the LDs.

A collection of the ENs connected to the CER is referred to as an edge tree, and the CER is adapted to advertise a default route to the edge tree. A host added to the EN firstly sends a registration message along the default route reaching the CER, and the registration message includes a host ID (HI) and a host location information (host locator) of the host, in which the host locator is the location information of the host in the current LD. The CER saves a mapping relation between the HI and the host locator, and in this manner, the CER knows how to reach the host in the connected edge tree. The CN has a distributed hash table (DHT) system, which is adopted to store a mapping relation between the CER ID and a CER locator in the CN.

FIG. 1 is a schematic system view of a Node ID network architecture in the conventional art, which includes one CN and three ENs. The LD of the CN is LD1, the LDs of the three ENs are respectively LD2, LD3, and LD4, in which the LD2 and the LD3 are respectively connected to the CN through NR2 and NR3, and the LD4 is connected to the LD2 through NR4 so that the NR2 and the NR3 are CERs, and the NR4 is the ER.

In the Node ID architecture, a data forwarding process includes the steps as follows.

A source host searches for the HI and the CER ID corresponding to a target host through a domain name server (DNS), and the DNS stores mapping relations between a host name and the HI and between the HI and the CER ID. As follows, in order to differentiate the two CERs corresponding to the source host and the target host, the CER corresponding to the source host is referred to as an ingress CER, and the CER corresponding to the target host is referred to as an egress CER. The source host sends a data packet to the ingress CER along the default route reaching the CN, and the packet carries the HI of the target host and the CER ID of the egress CER. After receiving the data packet from the source host, the ingress CER searches for the locator corresponding to the CER ID of the egress CER through looking up the DHT in the CN. The received packet is sent to the egress CER through the obtained Locator, and then the packet is forwarded to the target host by the egress CER.

It is known from the above mentioned that in the Node ID architecture of the conventional art, the host name, the HI, and the CER ID are registered in the DNS. When the host is quickly switched among the LDs, the mapping relations between the host name and the HI and between the HI and the CER ID after the switching need to be reregistered in the DNS. When the data is to be sent to the host, the CER ID of the LD where the host is located is queried from the DNS by adopting a DNS recursive querying method. In the method, the host firstly queries from the local DNS. If the corresponding item is not found, the host queries from the upper level DNS, and if the corresponding item is still not found, the host continuously queries from the upper level DNS until reaching a ROOT DNS so that the querying method has a rather lower efficiency. Therefore, when the LD where the host is located is dynamically and quickly updated, the update and query efficiency of the registration information from the host in the conventional art is relatively low.

In addition, the ER in the Node ID architecture needs to store the mapping relationship between the HI and the host location information (host locator) of all the hosts connected to the LD thereof, and the CER needs to store the mapping relation between the HI and the host locator of all the hosts in the edge tree connected thereof. Therefore, when the LD or the edge tree has a great number of hosts, the route table capacity of the CER and the ER may form a bottle neck, and thus the extendibility of the existing Node ID network architecture is rather poor.

SUMMARY

One of various embodiments of the present invention provides a method for registering host information to distinctly improve an update efficiency of registration information of a host.

One of various embodiments of the resent invention also provides a method for sending data to distinctly improve a query efficiency of the registration information from the host.

One of various embodiments of the present invention further provides a multi-address space mobile network architecture for realizing the method for registering host information and the method for sending data.

The method for registering host information provided in one of the various embodiments includes the steps as follows: (1) the host acquires a routable host locator in an EN to which the host is currently added and information of a CER in the EN; and (2) the host sends registration information to a CN through the CER in the EN, in which the registration information includes an HI of the host, a host locator, and CER IDs of one or more CERs in the EN.

The method for sending data provided in one of the various embodiments includes the steps as follows.

When a source host needs to send a data packet to a target host, the source host searches for a CER ID and a host locator corresponding to an HI of the target host from a CN through an ingress CER of an EN in the source host is located according to the HI of the target host.

The source host sends the data packet to the ingress CER, in which the data packet carries a CER ID and a host locator of an egress CER corresponding to the HI of the target host.

The ingress CER receives the data packet, searches for the locator of the egress CER from the CN according to the CER ID of the egress CER carried in the data packet, and forwards the received data packet to the egress CER according to the searched locator of the egress CER.

The egress CER receives the data packet, and forwards the data packet to the target host by adopting the host locator carried in the data packet.

The multi-address space mobile network architecture provided in one of the various embodiments includes a CN and ENs. (1) The CN and the ENs adopt independent address spaces, and the ENs are connected to the CN through CERs. (2) A DHT is set in the CN, and is adapted to receive registration information sent by a host through the CER, to store or update mapping relations between an HI and a CER ID and between the HI and a host locator, and to store or update a mapping relation between the CER ID and a CER locator in the CN.

The CER is adapted to advertise the EN connected to the CER of a default route reaching the CN; forward the registration information from the host to the DHT; and receive a query message from the host, query in the DHT according to the query message, and return a query result to the corresponding host.

In the embodiments of the present invention, the mapping relationship between the host name and the HI, and the mapping relationships between the HI and the CER ID and between the HI and the host locator are respectively stored in the DNS and the DHT of the CN so that when the host is switched among the LDs or moves in the LD, it is only necessary to update the CER ID and the host Locator corresponding to the HI in the DHT, thereby improving the update efficiency of the registration information from the host. Meanwhile, when another source host knowing the HI of the target host sends the data packet to the target host, it is only necessary to query the CER ID and the host locator corresponding to the HI of the target host in the DHT. Therefore, in the method for sending data provided in the embodiment of the present invention, the efficiency of querying the mapping relations between the HI and the CER ID and between the HI and the host locator is improved.

In the multi-address space mobile network architecture of the present invention, the DHT of the CN is adapted to not only receive the registration information sent from the host through the CER, and store or update the mapping relations between the HI and the CER ID and between the HI and the host locator, but also store or update the mapping relation between the CER ID and the CER locator in the CN. Therefore, the network architecture and the CN of the present invention may realize the method for registering host information and the method for sending data.

DETAILED DESCRIPTION

Figure 1:
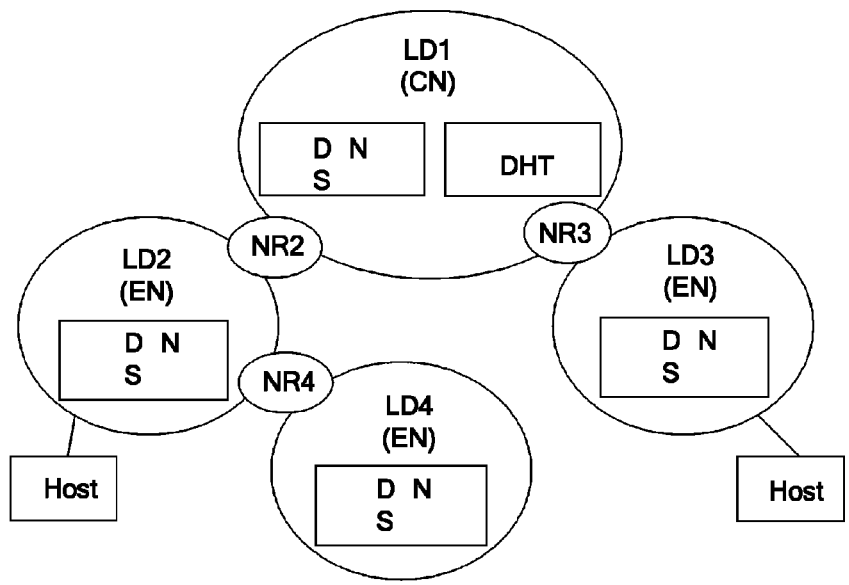
FIG. 1 is a schematic system view of a Node ID network architecture in the conventional art.

In order to make the above features and advantages of the present invention clear, a detailed description is given below by reference to embodiments and accompanying drawings.

In the embodiments of the present invention, a mapping relationship between a host name and an HI, and mapping relationships between the HI and a CER ID and between the HI and a host locator are separately stored. The mapping relationship between the host name and the HI is static and relatively stable, and may be stored and queried by adopting a DNS. By reason of the mobility of the host, the mapping relations between the HI and the CER ID and between the HI and the host locator are dynamically changed so that the mapping relations may be stored and queried by adopting a DHT manner.

By adopting the separate storing manner, when the host is switched among the LDs or moves in the LD, it is only necessary to update the CER ID and the host Locator corresponding to the HI in the DHT. Meanwhile, when another source host knowing the HI of the target host sends the data packet to the target host, it is only necessary to query the CER ID and the host locator corresponding to the HI of the target host in the DHT. Therefore, in the embodiment of the present invention, the update and query efficiency of the mapping relations between the HI and the CER ID and between the HI and the host locator is improved.

The multi-address space mobile network architecture according to the embodiments of the present invention adopts a two-level structure, that is, the network has one CN and a plurality of ENs. All the ENs are directly connected to the CN through the CERs, and the CER connected to the EN is needed to uniquely identify the EN. The CN and each of the ENs adopt independent address spaces, which may be the same or different.

One EN may be connected to the CN through one or more CERs. The CN and the ENs in the network architecture may respectively adopt different address spaces.

If one CER only has one CER ID, the CER may be only connected to one EN. If one physical CER may be divided into a plurality of logic CERs having different CER IDs, the physical CER may be connected to a plurality of ENs, and the uniqueness of the EN is identified by the CER ID of the logic CER, that is, one CER ID corresponds to one EN.

A DHT is set in the CN of the network architecture, and the DHT is adapted to receive the registration information sent by the host through the CER, to store or update mapping relations between the HI and the CER ID and between the HI and the host location information, and to store or update the mapping relation between the CER ID and the CER location information in the CN.

The CER connected to the EN and the CN is adapted to advertise the EN connected to the CER of the default route reaching the CN, forward the registration information from the host to the DHT; and receive a query message from the host, query from the DHT according to the query message, and return a query result to the corresponding host.

Figure 2:
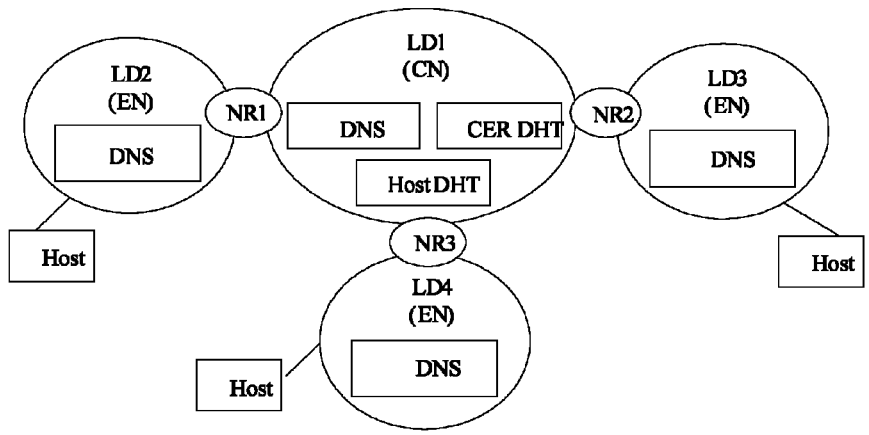
FIG. 2 is a schematic view of a multi-address space mobile network architecture according to an embodiment of the present invention.

FIG. 2 is a schematic view of the multi-address space mobile network architecture according to an embodiment of the present invention. The architecture includes one CN and three ENs, the four networks respectively adopt different address spaces. The CN is identified by LD1, and the three ENs are respectively identified by LD2, LD3, and LD4. The three ENs are connected to the CN through NR1, NR2, and NR3. The NR1, the NR2, and the NR3 are CERs.

The CN includes the DNS and two DHT systems, one is the host DHT, and the other is the CER DHT. The function and the organization manner of the DNS are the same as those in the conventional art, so it is not repeated here.

The host DHT is adapted to store the mapping relations between the HI and the CER ID and between the HI and the host locator, receive the registration information sent by the host through the CER, and update the stored mapping relations between the HI and the CER ID and between the HI and the host locator according to the received registration information.

The CER DHT is adapted to store the mapping relation between the CER ID and the CER locator.

Each CER in the architecture is adapted to advertise the EN connected to the CER of the default route reaching the CN, and the default route information includes the CER ID of the CER and the CER locator information in the EN connected to the CER. In this manner, all the routers in the EN connected to the CER may acquire the CER information in the EN.

The CER Locator information in the EN connected to the CER mentioned here refers to the locator reachable by the CER in the EN. Each CER in the architecture is connected to the EN and the CN, and the locators in the EN and the CN are different, for example, the CN adopts an IPV4 address space, and the EN adopts an IPV6 address space, the CER locator in the CN is a reachable IPV4 address in the CN, the locator in the EN is a reachable IPV6 address in the EN.

Each CER in the architecture is further adapted to receive registration information from the host, forward the registration information to the host DHT in the CN, receive the query message from the host, query from the host DHT in the CN according to the query message, and return a query result to the corresponding host.

In order to ensure the normal communication among the hosts in the EN when the connection between the EN and the CN is interrupted, the CER in the architecture further includes an information storing module and an information querying module.

The information storing module is adapted to save the received registration information when the connection between the EN and the CN through the CER is interrupted, and the registration information carries the mapping relations between the HI and the CER ID and between the HI and the host locator.

The information querying module is adapted to receive the query message from the host, retrieve the registration information saved by the information storing module according to the query message, and return a retrieval result to the corresponding host.

In another manner for ensuring the normal communication among the hosts in the EN when the connection between the EN and the CN is interrupted, an EN host DHT is set in each EN in the network architecture, and is adapted to store or update mapping relations between the HI of the EN local host and host locator and between the HI of the EN local host and the CER ID. The EN host DHT set in the EN is adapted to meet the communication demand among the hosts in the EN, particularly, when the connection between the EN and the CN is interrupted.

It is known from the above mentioned that the CER in the architecture needs not to save the mapping relation between the HI and the Locator of all the hosts in the edge tree connected to the CER, or when the connection between the CN and EN is interrupted, the CER is adapted to save the received registration information so that as compared with the network architecture in the conventional art, the network architecture according to the embodiment of the present invention has better extendibility.

The embodiments of the present invention further provide a method for registering host information, which includes the steps as follows.

The host acquires the routable host location information in the currently added EN and the CER information in the EN. The host sends the registration information to the CN through the CER in the currently added EN, and the registration information includes the HI of the host, the host location information, and the CER IDs of one or more CERs in the EN.

Figure 3:
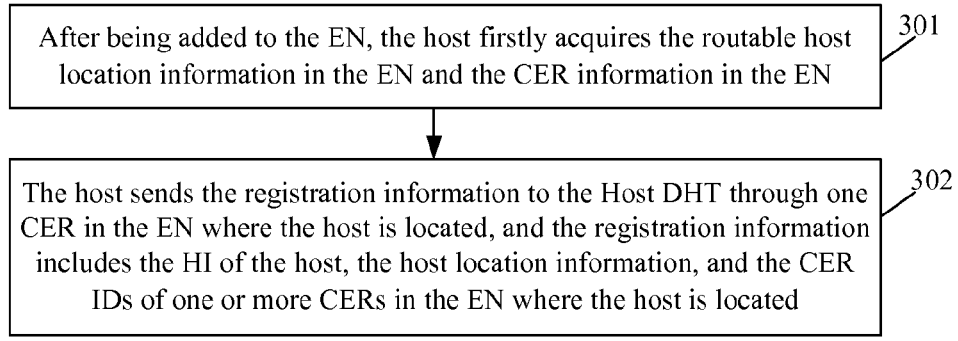
FIG. 3 is a flow chart of a method for registering host information according to the embodiment of the present invention.

FIG. 3 is a flow chart of the method for registering host information according to the embodiment of the present invention, and the flow includes the steps as follows.

In Step 301, after being added to the EN, the host firstly acquires the routable host locator in the EN and the CER information in the EN.

In the step, the manner of the host acquiring the routable host locator in the EN includes dynamically acquiring an IP address through a dynamic host configuration protocol (DHCP) manner, or generating an IPv6 address through a stateless address automatic configuration manner of IPv6. The manner of the host acquiring the CER information in the EN includes that a DHCP relay of the default gateway router in the EN adds the CER information in the EN to an extension option of the DHCP, and sends the extension option to the host, or the CER information in the EN is sent to the host through an IPv6 router advertisement information of the default gateway router.

The CER information in the EN includes the CER ID, the CER location information in the EN, and other information, such as a distance from the CER to the router. The information is extracted by the router in the EN from the route information reaching the CN advertised by the CER, and is notified to the host.

In Step 302, the host sends the registration information to the host DHT through a CER in the EN where the host is located, and the registration information includes the HI of the host, the host Locator, and the CER IDs of one or more CERs in the EN where the host is located.

In the step, the host sends the registration information to a CER in the EN, and then the received registration information is registered in the host DHT in the CN by the CER proxy.

The CER ID of the CER in the EN where the host is located carried in the registration information is at least the CER ID of one CER in the EN, the CER IDs of all the CERs in the EN, or the CER IDs of a part of the CERs in the EN.

When the host is switched among the LDs or moves in the LD, the host reregisters the new CER ID and the host Locator in the host DHT in the CN through the CER of the LD where the host is currently located, and notifies the current CER ID and the host Locator to a communicating peer host so as to ensure that the session is not interrupted during the moving process.

If the EN host DHT is set in each of the ENs in the network architecture, when the connection between the EN and the CN is interrupted, after the host is added to the EN, the host sends the registration information to the EN host DHT in the EN, and the registration information includes the HI of the host, the host Locator, and the CER IDs of all the CERs of the EN where the host is located. When the host moves in the EN, the host re-registers the new mapping relations between the HI and the CER ID and between the HI and the host Locator in the EN host DHT in the EN where the host is located.

When the EN moves, the CER in the EN is connected to the CN through another location of the CN, the locator of the CER in the CN, i.e. the CER locator, is changed. Under the situation, the host in the moving EN needs not to reregister the location information, and it is only required that the CER registers the CER ID and the newest CER Locator in the CER DHT, that is, the moving of the EN is transparent for the host.

The present invention further provides a method for sending data, which includes the steps as follows.

The source host searches for the CER ID and the host location information corresponding to a target host from the CN through the ingress CER in the EN where the host is located according to the HI of the target host. The source host sends the data packet to the ingress CER. The ingress CER receives the data packet from the source host, and searches from the CN for the location information of the egress CER connected to the EN where the target host is located, according to the CER ID carried in the data packet. According to the searched location information of the egress CER, the received data packet is forwarded to the egress CER. The egress CER receives the data packet from the ingress CER, and forwards the data packet to the target host by adopting the host location information carried in the data packet.

Before the source host sends the data packet to the ingress CER, the method further includes that the source host judges whether the CER ID thereof is the same as the searched CER ID of the target host, and if the CER ID thereof is the same as the searched CER ID of the target host, the source host sends the data packet to the target host by directly adopting the searched host location information of the target host; otherwise, the source host sends the data packet to the ingress CER, and executes a subsequent data packet forwarding process.

Figure 4:
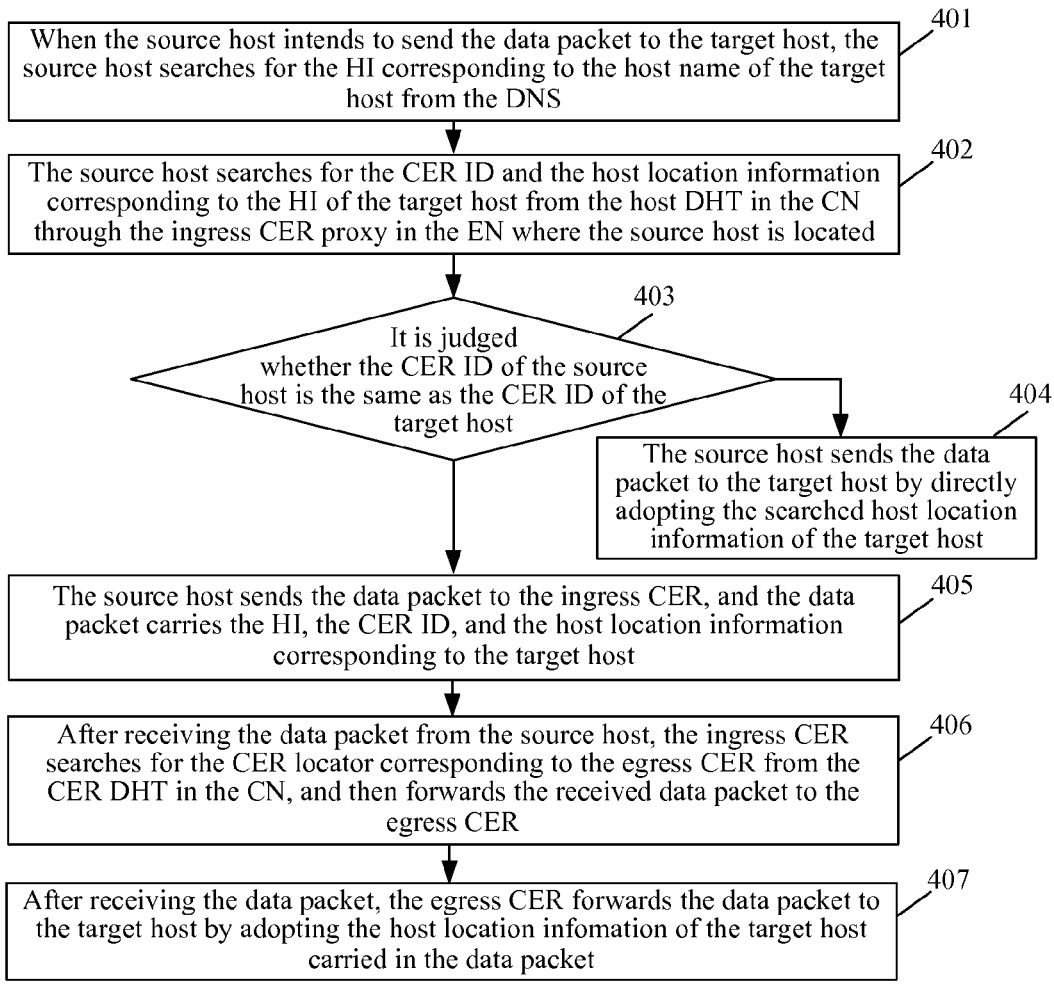
FIG. 4 is a flow chart of a method for sending data according to the embodiment of the present invention.

FIG. 4 is a flow chart of the method for sending data according to the embodiment of the present invention, and the flow includes the steps as follows.

In Step 401, when the source host intends to send the data packet to the target host, the source host searches for the HI corresponding to the host name of the target host from the DNS.

Here, when the source host searches for the HI corresponding to the host name of the target host from the DNS, the source host performs the search from the DNS in the LD where the source host is located, or performs the search from the DNS in the CN through the CER relay.

In Step 402, the source host searches for the CER ID and the host locator corresponding to the HI of the target host from the Host DT in the CN through the ingress CER proxy in the EN where the source host is located.

In the Step, the EN and the CN adopt the different address spaces, the DHT in the CN adopts the address space of the CN, the host in the EN host adopts the address space of the EN so that the host of the EN cannot directly get access to the DHT, and the CER relay is required. Particularly, the CER receives the query message from the source host, performs the search from the host DHT in the CN according to the query message, and return the query result to the source host.

In Step 403, the source host firstly judges whether the CER ID thereof is the same as the CER ID of the target host, that is, whether the source host and the target host are located in the same EN, and if the CER ID thereof is the same as the CER ID of the target host, Step 404 is executed; otherwise, Step 405 is executed.

In Step 404, the source host sends the data packet to the target host by directly adopting the searched host locator of the target host.

In Step 405, the source host sends the data packet to the ingress CER, and the data packet carries the HI, the CER ID, and the host locator corresponding to the target host.

In Step 406, after receiving the data packet from the source host, the ingress CER searches for the CER locator corresponding to the egress CER in the CER DHT in the CN, and then forwards the received data packet to the egress CER by adopting the searched CER Locator.

In Step 407, after receiving the data packet from the ingress CER, the egress CER forwards the data packet to the target host by adopting the host locator of the target host carried in the data packet.

The host DHT exists in the CN, so when the host in the EN performs the information registration and query, the CER of the EN needs to serve as the proxy. When the connection between the EN and the CN is interrupted, the registration message is saved in the CER. After the query message sent from the source host reaches the CER, the CER retrieves the mapping information saved therein, acquires the host locator of the target host, and returns the host locator of the target host to the source host. The source host sends the data packet to the target host according to the received host locator of the target host. In this manner, when the connection between the EN and the CN is interrupted, the communication among the hosts in the EN may be maintained.

If the EN host DHT is set in each EN in the network architecture, when the connection between the EN and the CN is interrupted, and the source host in the EN needs to send the data packet to the target host in the EN, the source host in the EN queries the host locator corresponding to the HI of the target host from the EN host DHT in the EN, and sends the data packet to the target host through the searched host locator.

It is known from the above mentioned that in embodiments of the present invention, the mapping relation between the host name and the HI, and the mapping relations between the HI and the CER ID and between the HI and the host locator are respectively stored in the DNS and the DHT of the CN so that the update and query efficiency of the registration information from the host is distinctly improved. In addition, in embodiments of the present invention, the mapping relation between the HI and the Locator is maintained by the host DHT system in the CN instead of the CER, thereby improving the extendibility of the whole network architecture.

Those of ordinary skill should understand that all or a part of the steps of the method may be accomplished through program instruction relevant hardware, and the mentioned program may be stored in a computer readable storage medium. When the program is executed, the steps in the embodiments of the method are executed, and the storage medium includes read only memory (ROM), random access memory (RAM), disk, optical disk, or various mediums capable of storing program codes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope and sprit of the following claims and their equivalents.

What is claimed is:

1. A multi-address space mobile network system, comprising:
    a core network (CN) and edge networks (ENs),
    wherein the CN and the ENs are configured to adopt independent address spaces, and each EN is connected to the CN through a core edge router (CER);

wherein a Domain Name Server (DNS) is configured to be set in the CN and is configured to store a first mapping relationship between a host name and a host identifier (HI);

wherein the CN comprises a tangible non-transient computer-readable medium, including a distributed hash table (DHT) set in the computer-readable medium, and the DHT includes computer-executable instructions for:
receiving registration information sent by a host through the CER,
storing or updating a second mapping relationship between the HI and a CER identifier (ID),
storing or updating a third mapping relationship between the HI and host location information, and
storing or updating a fourth mapping relationship between the CER ID and CER location information in the CN;

wherein the CER comprises a tangible non-transient computer-readable medium, the computer readable medium including computer-executable instructions for: advertising the EN connected to the CER of a default route reaching the CN; forwarding the registration information from the host to the DHT; and receiving a query message from the host, querying in the DHT according to the query message, and returning a query result to the corresponding host;

wherein the first mapping relationship is absent from the DHT; and wherein the second mapping relationship, the third mapping relationship, and the fourth mapping relationship are absent from the DNS.

2. The multi-address space mobile network system according to claim 1, wherein:
the DHT comprises a host DHT and a CER DHT;
the host DHT receives the registration information sent by the host through the CER, and stores or updates the second mapping relationship and the third mapping relationship; and
the CER DHT stores or updates the fourth mapping relationship in the CN.

3. The multi-address space mobile network system according to claim 1, wherein the CER comprises:
an information storing module for storing the received registration information when a connection between the EN and the CN through the CER is interrupted; and
an information querying module for receiving the query message from the host, retrieving the registration information saved by the information storing module according to the query message, and returning a retrieval result to the corresponding host.

4. The multi-address space mobile network system according to claim 2, wherein the CER comprises:
an information storing module for storing the received registration information when a connection between the EN and the CN through the CER is interrupted; and
an information querying module for receiving the query message from the host, retrieving the registration information saved by the information storing module according to the query message, and returning a retrieval result to the corresponding host.

5. The multi-address space mobile network system according to claim 1, wherein an EN host DHT is set in each of the EN in the network system, and stores or updates mapping relationships of the HI of the EN local host and the host location information and between the HI of the EN local host and the CER ID.

6. The multi-address space mobile network system according to claim 2, wherein an EN host DHT is set in each of the ENs in the network architecture, and stores or updates mapping relationships of the HI of the EN local host and the host location information and between the HI of the EN local host and the CER ID.

7. A method for registering host information, comprising:
acquiring, by a host, routable host location information in an edge network (EN) to which the host is currently added, and information of a core edge router (CER) in the EN; and
sending, by the host, registration information to a core network (CN) through the CER in the EN, wherein the registration information comprises a host identifier (HI) of the host, host location information, and CER identifiers (IDs) of one or more CERs in the EN where the host is located;

wherein a distributed hash table (DHT) is set in the CN for receiving the registration information sent by the host through the CER and a first mapping relationship between the host name and the HI is stored in a DNS in the CN;

wherein the DHT is used to store and update a second relationship between the host identifier (HI) and a CER identifier (ID), a third relationship between the HI and host location information, and a fourth relationship between the CER ID and CER location information in the CN;

wherein the first mapping relationship is absent from the DHT; and wherein the second mapping relationship, the third mapping relationship, and the fourth mapping relationship are absent from the DNS.

8. The method for registering host information according to claim 7, wherein the acquiring the routable host locator comprises at least one of:
dynamically acquiring, by the host, an Internet protocol (IP) address in a dynamical host configuration protocol (DHCP) manner; and
generating an Internet protocol version 6 (IPv6) address in a stateless address automatic configuration manner of IPv6.

9. The method for registering host information according to claim 7, wherein the acquiring the information of the CER comprises one of:
adding, by a DHCP relay of a default gateway router in the EN, the information of the CER to an extension option of the DHCP, and sending the extension option to the host; or
sending the information of the CER to the host through IPv6 router advertisement information of the default gateway router.

10. The method for registering host information according to claim 7, further comprising:
re-registering, by the host, new mapping relationships between the HI and the CER ID and between the HI and the host location information to the CN through the CER of the EN in which the host is currently located when the host confirms that the host itself moves; and notifying the current CER ID and the host location information of the host to a communicating peer host.

11. The method for registering host information according to claim 8, further comprising:
re-registering, by the host, new mapping relationships between the HI and the CER ID and between the HI and the host location information to the CN through the CER of the EN in which the host is currently located when the host confirms that the host itself moves; and notifying the current CER ID and the host location information of the host to a communicating peer host.

12. The method for registering host information according to claim 9, further comprising:
re-registering, by the host, new mapping relationships between the HI and the CER ID and between the HI and the host location information to the CN through the CER of the EN in which the host is currently located when the host confirms that the host itself moves; and notifying the current CER ID and the host location information of the host to a communicating peer host.

13. The method for registering host information according to claim 7, wherein if an EN host distributed hash table (DHT) is set in the EN in a network architecture, the method further comprises:
sending, by the host added to the EN, the registration information to the EN host DHT in the EN when a connection between the EN and the CN is interrupted; and
re-registering, by the host, the new mapping relationships between the HI and the CER ID and between the HI and the host location information to the EN host DHT in the EN in which the host is located when the host in the EN moves in the EN.

14. The method for registering host information according to claim 8, wherein if an EN host DHT is set in the EN in a network architecture, the method further comprises:
sending, by the host added to the EN, the registration information to the EN host DHT in the EN when a connection between the EN and the CN is interrupted; and
re-registering, by the host, the new mapping relationships between the HI and the CER ID and between the HI and the host location information to the EN host DHT in the EN in which the host is located when the host in the EN moves in the EN.

15. The method for registering host information according to claim 9, wherein if an EN host DHT is set in the EN in a network architecture, the method further comprises:
sending, by the host added to the EN, the registration information to the EN host DHT in the EN when a connection between the EN and the CN is interrupted; and
re-registering, by the host, the new mapping relationships between the HI and the CER ID and between the HI and the host location information to the EN host DHT in the EN in which the host is located when the host in the EN moves in the EN.

16. A method for sending data, comprising:
searching for, by a source host, a host ID (HI), corresponding to the host name of a target host from a Domain Name Server (DNS), when the source host intends to send a data packet to the target host;
searching for, by a source host, a core edge router identifier (CER ID) and host location information corresponding to the HI of the target host from a distributed hash table (DHT) set in a core network (CN) through an ingress CER of an edge network (EN) in which the source host is located according to the HI of the target host when the source host needs to send a data packet to the target host;
sending, by the source host, the data packet to the ingress CER, wherein the data packet carries a CER ID and host location information of an egress CER corresponding to the HI of the target host;
receiving, by the ingress CER, the data packet, and searching for the location information of the egress CER from the CN according to the CER ID of the egress CER carried in the data packet, and forwarding the received data packet to the egress CER according to the searched location information of the egress CER; and
receiving, by the egress CER, the data packet, and forwarding the data packet to the target host by adopting the host location information carried in the data packet;
wherein the DNS is used to store a first mapping relationship between a host name and a HI, the DHT is used to store and update a second mapping relationship between the HI and a CER ID, a third mapping relationship between the HI and host location information, and a fourth mapping relationship between the CER ID and CER location information in the CN;
wherein the first mapping relationship is absent from the DHT; and
wherein the second mapping relationship, the third mapping relationship, and the fourth mapping relationship are absent from the DNS.

17. The method for sending data according to claim 16, before sending, by the source host, the data packet to the ingress CER, further comprising:
judging, by the source host, whether the CER ID corresponding to the HI thereof is the same as the searched CER ID corresponding to the HI of the target host;
sending, by the source host, the data packet to the target host by directly adopting the searched host location information of the target host if the CER ID corresponding to the HI thereof is the same as the searched CER ID corresponding to the HI of the target host; otherwise
sending, by the source host, the data packet to the ingress CER and executing a subsequent data packet forwarding process.

18. The method for sending data according to claim 16, wherein when the connection between the EN and the CN is interrupted, and a registration message of the host added to the EN is saved in the CER corresponding to the EN, the method further comprising:
when the source host in the EN needs to send the data packet to the target host in the EN, sending by the source host, a query message to the CER corresponding to the EN, retrieving, by the CER, the mapping information saved therein, acquiring the host location information of the target host and returning the host location information of the target host to the source host; and
sending, by the source host, the data packet to the target host according to the received host location information of the target host.

19. The method for sending data according to claim 17, wherein when the connection between the EN and the CN is interrupted, and a registration message of the host added to the EN is saved in the CER corresponding to the EN, the method further comprising:
when the source host in the EN needs to send the data packet to the target host in the EN, sending by the source host, a query message to the CER corresponding to the EN, retrieving, by the CER, the mapping information saved therein, acquiring the host location information of the target host and returning the host location information of the target host to the source host; and
sending, by the source host, the data packet to the target host according to the received host location information of the target host.

20. The method for sending data according to claim 16, wherein when the connection between the EN and the CN is interrupted, and a registration message of the host added to the EN is saved in an EN host distributed hash table (DHT) in the EN, the method further comprising:

querying, by the source host, the host location information corresponding to the target host HI from the EN host DHT in the EN and sending the data packet to the target host through the queried host location information when the source host in the EN needs to send the data packet to the target host in the EN.

21. The method for sending data according to claim 17, wherein when the connection between the EN and the CN is interrupted, and a registration message of the host added to the EN is saved in an EN host DHT in the EN, the method further comprising:

querying, by the source host, the host location information corresponding to the target host HI from the EN host DHT in the EN and sending the data packet to the target host through the queried host location information when the source host in the EN needs to send the data packet to the target host in the EN.

\* \* \* \* \*